United States Patent
Kim et al.

(10) Patent No.: US 10,271,372 B2
(45) Date of Patent: Apr. 23, 2019

(54) METHOD AND DEVICE FOR ESTABLISHING RRC CONNECTION FOR SCPTM RECEPTION

(71) Applicant: LG ELECTRONICS INC., Seoul (KR)

(72) Inventors: Sangwon Kim, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/541,701

(22) PCT Filed: Jan. 8, 2016

(86) PCT No.: PCT/KR2016/000184
§ 371 (c)(1),
(2) Date: Jul. 5, 2017

(87) PCT Pub. No.: WO2016/111580
PCT Pub. Date: Jul. 14, 2016

(65) Prior Publication Data
US 2018/0279405 A1    Sep. 27, 2018

Related U.S. Application Data

(60) Provisional application No. 62/101,391, filed on Jan. 9, 2015.

(51) Int. Cl.
*H04B 7/06* (2006.01)
*H04L 1/18* (2006.01)
(Continued)

(52) U.S. Cl.
CPC ............ *H04W 76/27* (2018.02); *H04W 4/06* (2013.01); *H04W 24/10* (2013.01); *H04W 48/02* (2013.01);
(Continued)

(58) Field of Classification Search
CPC .... H04B 7/0626; H04L 65/102; H04W 16/14; Y02D 70/26
(Continued)

(56) References Cited

U.S. PATENT DOCUMENTS

2009/0176495 A1* 7/2009 Beming ................ H04W 36/12
455/436
2010/0309836 A1* 12/2010 Sugawara ......... H04W 72/1231
370/312
(Continued)

FOREIGN PATENT DOCUMENTS

| WO | 2013025033 | 2/2013 |
| WO | 2014163377 | 10/2014 |

OTHER PUBLICATIONS

European Patent Office Application Serial No. 16735201.2, Search Report dated Jun. 19, 2018, 9 pages.
(Continued)

*Primary Examiner* — Christopher R Crompton
(74) *Attorney, Agent, or Firm* — Lee Hong Degerman Kang & Waimey

(57) ABSTRACT

Provided are: a method by which a terminal, which is interested in a single-cell point-to-multipoint (SCPTM) transmission, establishes an RRC connection in a wireless communication system; and a device for supporting the same. A list of available SCPTM services is received from a serving cell, it is determined whether the SCPTM service of interest from among the received list of the available SCPTM services is a first-type SCPTM service or a second-type SCPTM service, the RRC connection with a network is established when the determined SCPTM service of interest is the second-type SCPTM service, and the second-type SCPTM service can be received through the established RRC connection. The first-type SCPTM service is a service for which RRC connection establishment is not required for
(Continued)

the SCPTM service, and the second-type SCPTM service is a service for which RRC connection establishment is required for the SCPTM service.

14 Claims, 10 Drawing Sheets

(51) Int. Cl.
    *H04W 4/06*     (2009.01)
    *H04W 24/10*     (2009.01)
    *H04W 48/02*     (2009.01)
    *H04W 76/00*     (2018.01)
    *H04W 76/10*     (2018.01)
    *H04W 76/27*     (2018.01)
    *H04W 88/02*     (2009.01)

(52) U.S. Cl.
    CPC ........... *H04W 76/00* (2013.01); *H04W 76/10* (2018.02); *H04B 7/0626* (2013.01); *H04L 1/1812* (2013.01); *H04W 88/02* (2013.01)

(58) Field of Classification Search
    USPC .................................................. 370/328, 338
    See application file for complete search history.

(56) References Cited

U.S. PATENT DOCUMENTS

2011/0092240 A1*   4/2011   Aiba ..................... H04L 1/0025
                                                                   455/509
2013/0301509 A1*  11/2013   Purnadi ............... H04L 65/4076
                                                                   370/312

OTHER PUBLICATIONS

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V124.0, Dec. 2014, 251 pages.

PCT International Application No. PCT/KR2016/000184 Written Opinion of the International Searching Authority dated Apr. 12, 2016, 9 pages.

Alcatel-Lucent, "Control of MBMS service transmission in SC-ptm mode," 3GPP TSG-RAN #61 WG 2 LTE, R2-080983, Feb. 2008, 5 pages.

* cited by examiner

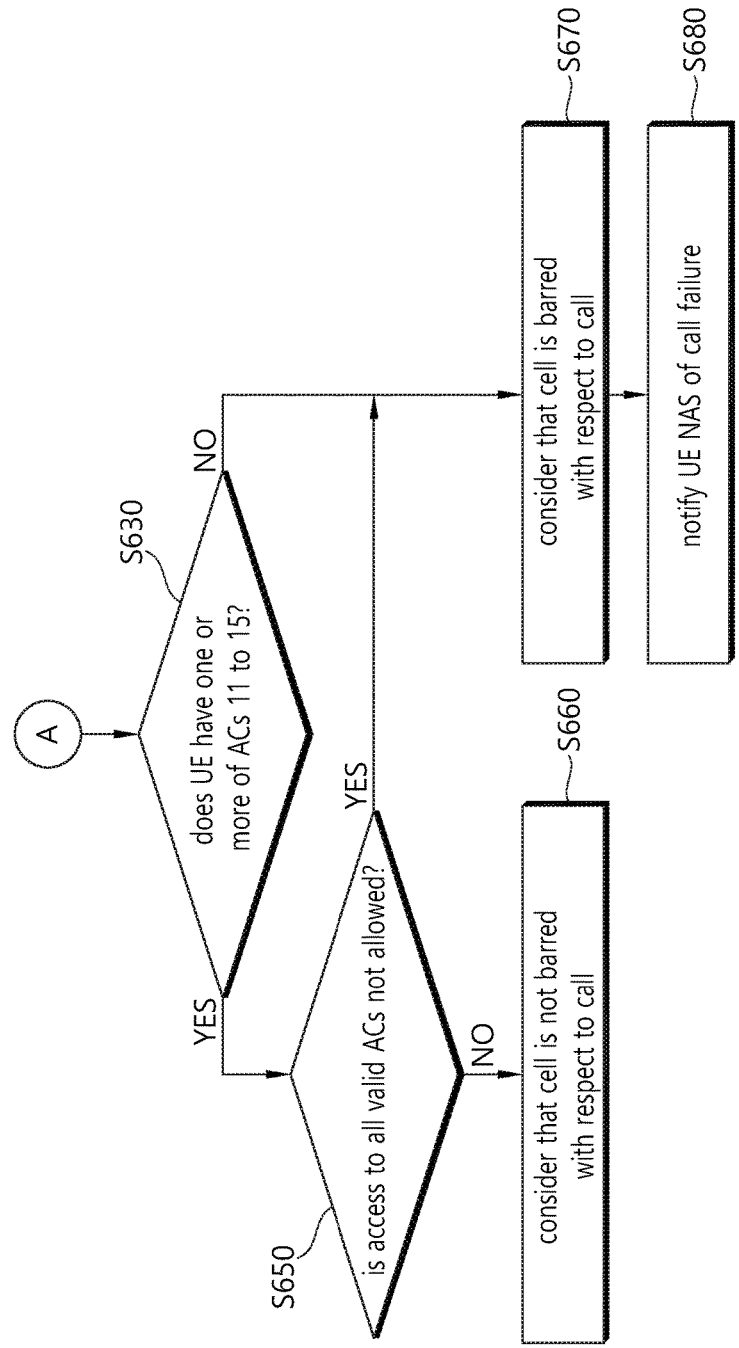

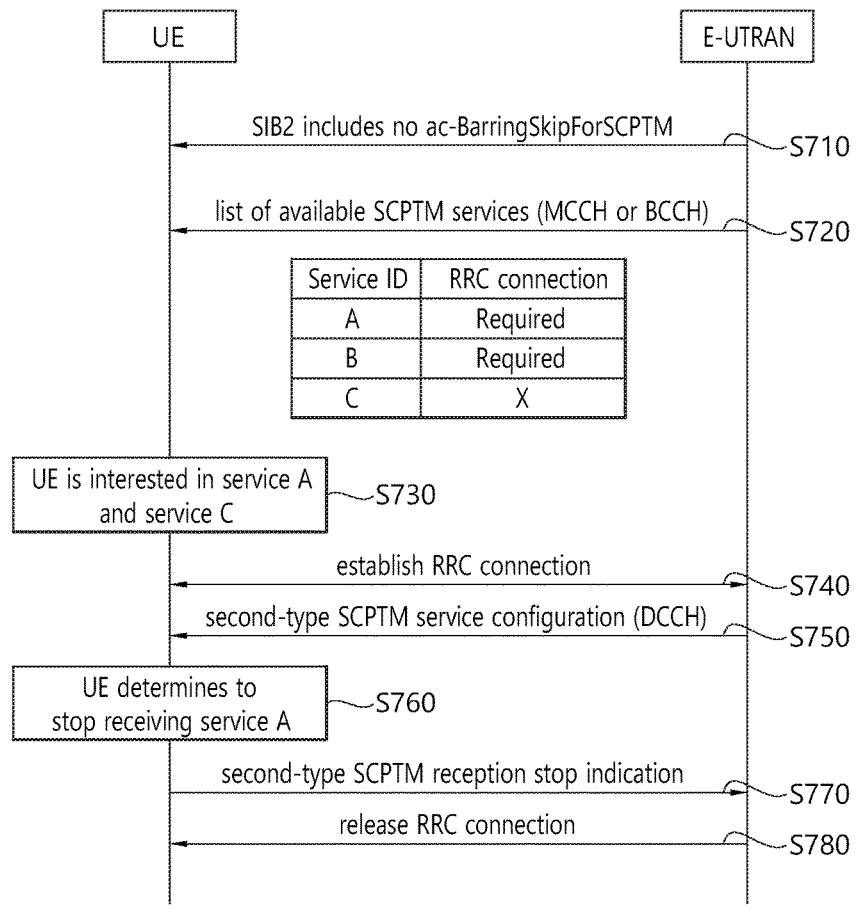

METHOD AND DEVICE FOR ESTABLISHING RRC CONNECTION FOR SCPTM RECEPTION

CROSS-REFERENCE TO RELATED APPLICATIONS

This application is the National Stage filing under 35 U.S.C. 371 of International Application No. PCT/KR2016/000184, filed on Jan. 8, 2016, which claims the benefit of U.S. Provisional Application No. 62/101,391 filed on filed on Jan. 9, 2015, the contents of which are all hereby incorporated by reference herein in its entirety.

BACKGROUND OF THE INVENTION

Field of the Invention

The present invention relates to a wireless communication system, and more particularly, to a method in which a user equipment (UE), which is interested in a single-cell point-to-multipoint (SCPTM) transmission, establishes an RRC connection to be provided with an SCPTM service, and a device for supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

A Multimedia Broadcast/Multicast Service (MBMS) is a service of simultaneously transmitting a data packet to a plurality of users, similar to an existing Cell Broadcast Service (CBS). However, the CBS is a low-speed message-based service, while the MBMS is designed for high-speed multimedia data transmission. Further, the CBS is not Internet Protocol (IP)-based, whereas the MBMS is based on IP multicast. According to the MBMS, when users of a certain level are present in the same cell, the users are allowed to receive the same multimedia data using a shared resource (or channel), and thus the efficiency of radio resources may be improved and the users may use a multimedia service at low costs.

The MBMS uses a shared channel so that a plurality of UEs efficiently receives data on one service. A BS allocates only one shared channel for data on one service, instead of allocating as many dedicated channels as the number of UEs to receive the service in one cell. The plurality of UEs simultaneously receives the shared channel, thus improving the efficiency of radio resources. Regarding the MBMS, a UE may receive the MBMS after receiving system information on the cell.

Significant communication technologies, such as those for public safety and group communication system enablers for LTE (GCSE_LTE), have been introduced in Rel-12. In Rel-12 GCSE, eMBMS is designated for group communication. eMBMS is designed to provide media content in a pre-planned large area (that is, an MBSFN area). An MBSFN area is rather static (for example, is configured by O&M) and cannot be dynamically adjusted according to user distribution. Even though all radio resources in a frequency domain are not used, eMBMS transmission occupies the entire system bandwidth and does not allow unicast and multiplexing in the same subframe. An MBSFN subframe configuration is also rather static (for example, is set by O&M). That is, the MBSFN subframe cannot be dynamically adjusted according to the number of dynamic groups and the traffic load of a dynamic group. Thus, when providing important communication services, radio resources configured for eMBMS may be unnecessarily wasted. Therefore, single-cell point-to-multipoint (SCPTM) transmission has been proposed for efficient use of radio resources. MBSFN transmission transmits identifiable signals simultaneously in a plurality of cells, whereas SCPTM transmission transmits MBMS services in a single cell.

SUMMARY OF THE INVENTION

Among single-cell point-to-multipoint (SCPTM) services, there may be services that need hybrid automatic repeat request (HARQ) feedback and channel state information (CSI) reporting. Since a user equipment (UE) needs a radio resource control (RRC) connection in order to perform HARQ feedback or CSI reporting, the UE needs to know whether it is necessary to establish an RRC connection to receive an SCPTM service. Accordingly, the present invention proposes a method for establishing an RRC connection by a UE interested in SCPTM transmission in a wireless communication system, and a device supporting the same.

A UE may receive a list of available SCPTM services from a serving cell and may determine whether an SCPTM service of interest in the list of available SCPTM services received is a service that needs RRC connection establishment. When the determined SCPTM service of interest is a service needing RRC connection establishment, the UE may establish an RRC connection and may receive the SCPTM service through the established RRC connection.

One embodiment provides a method for establishing an RRC connection by a UE interested in SCPTM transmission in a wireless communication system. The UE may include: receiving a list of available SCPTM services from a serving cell; determining whether an SCPTM service of interest in the list of available SCPTM services is a first-type SCPTM service or a second-type SCPTM service; establishing an RRC connection with a network when the determined SCPTM service of interest is the second-type SCPTM service; and receiving the second-type SCPTM service through the established RRC connection. The first-type SCPTM service is a service that requires no RRC connection establishment for the SCPTM service, and the second-type SCPTM service is a service that requires RRC connection establishment for the SCPTM service.

The method may further include receiving a second-type SCPTM service configuration from the serving cell, wherein the second-type SCPTM service configuration may include an HARQ feedback configuration or a CSI report configuration.

The second-type SCPTM service may be a service that requires HARQ feedback or CSI reporting.

The list of available SCPTM services may be broadcast through a broadcast control channel (BCCH) or multicast control channel (MCCH).

The list of available SCPTM services may include at least one of a service identifier, a temporary mobile group identifier (TMGI), and a session identifier.

It may be determined whether the SCPTM service of interest is the first-type SCPTM service or the second-type SCPTM service through a user service description (USD).

The method may further include receiving a type of the available SCPTM services directly from the serving cell, and the type of the available SCPTM services may be broadcast through a BCCH or MCCH.

The method may further include receiving SIB2 (SystemInformatioBlock2) from the serving cell, wherein when SIB2 includes ac-BarringSkipForSCPTM, the UE may consider that access to the serving cell is not barred.

The method may further include receiving SIB2 (SystemInformatioBlock2) from the serving cell, wherein when SIB2 includes no ac-BarringSkipForSCPTM, the UE may perform an access barring check according to an access class barring configuration for SCPTM, and an access barring factor of the access class barring configuration for SCPTM may be set greater than ac-BarringForMO-Signaling or ac-BarringForMO-Data.

The method may further include transmitting establishmentCause to the serving cell, wherein when establishmentCause indicates SCPTM reception, the network may always allow access of the UE.

The method may further include transmitting a second-type SCPTM reception stop indication to the network when it is determined to stop receiving the second-type SCPTM service.

Another embodiment provides a UE establishing an RRC connection in a wireless communication system. The UE includes: a memory; a transceiver; and a processor to connect the memory and the transceiver, wherein the processor may be configured to: control the transceiver to receive a list of available SCPTM services from a serving cell; determine whether an SCPTM service of interest in the list of available SCPTM services is a first-type SCPTM service or a second-type SCPTM service; establish an RRC connection with a network when the determined SCPTM service of interest is the second-type SCPTM service; and receive the second-type SCPTM service through the established RRC connection. The first-type SCPTM service is a service that requires no RRC connection establishment for the SCPTM service, and the second-type SCPTM service is a service that requires RRC connection establishment for the SCPTM service.

A UE may selectively establish an RRC connection with a network for a service that needs RRC connection establishment among SCPTM services.

BRIEF DESCRIPTION OF THE DRAWINGS

FIG. 6A and FIG. 6B show an ACB operation in case of an emergency call.
FIG. 7 illustrates a procedure in which a UE establishes an RRC connection for SCPTM reception according to one embodiment of the present invention.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
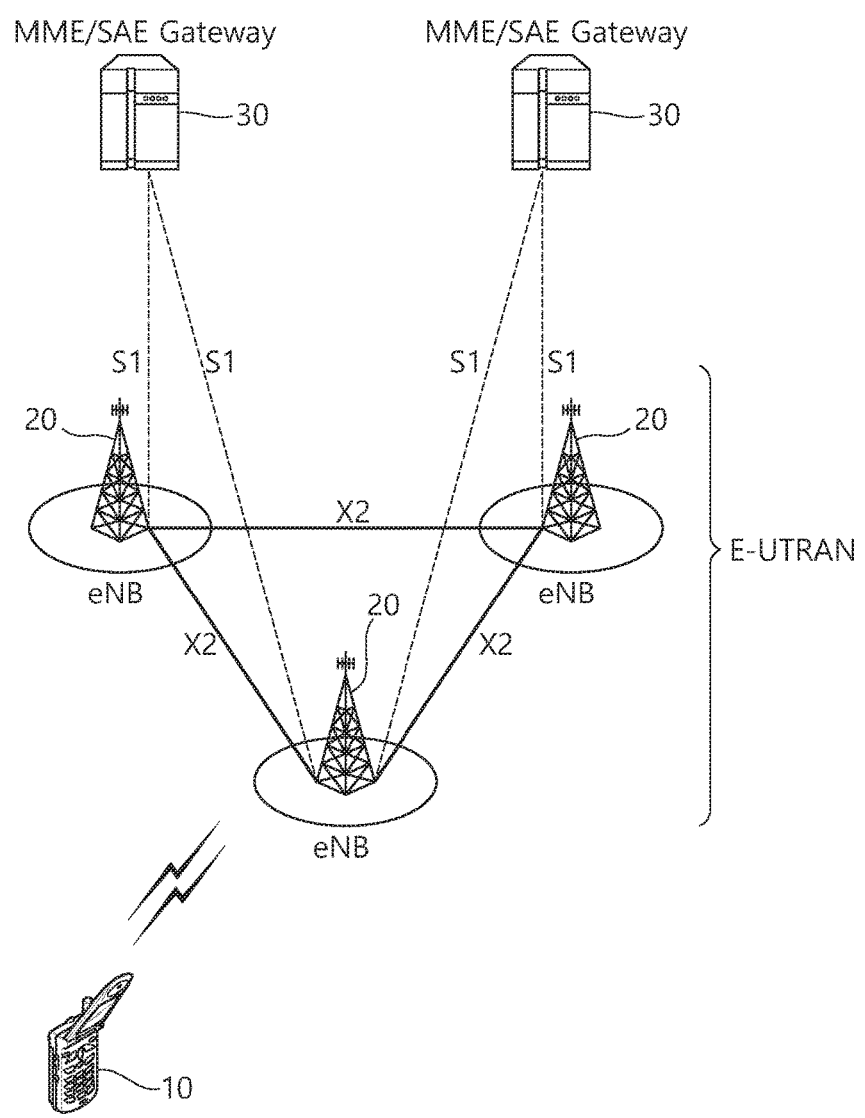
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
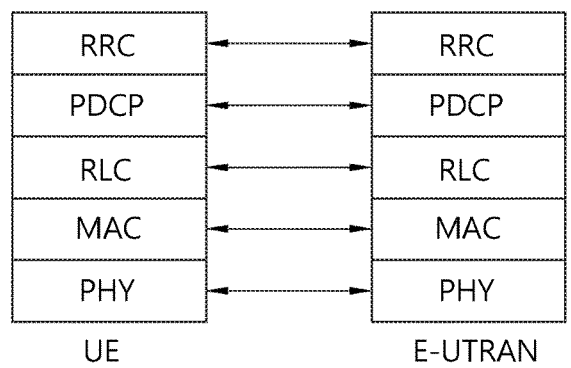
FIG. 2 shows a control plane of a radio interface protocol of an LTE system.
Figure 3:
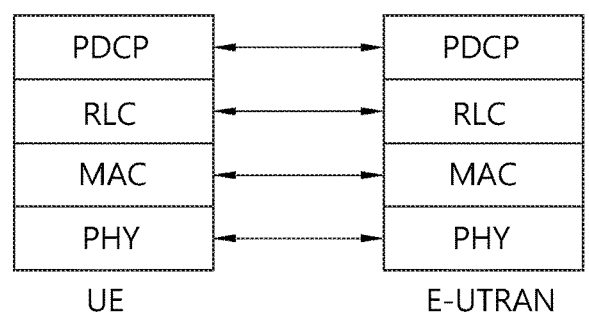
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
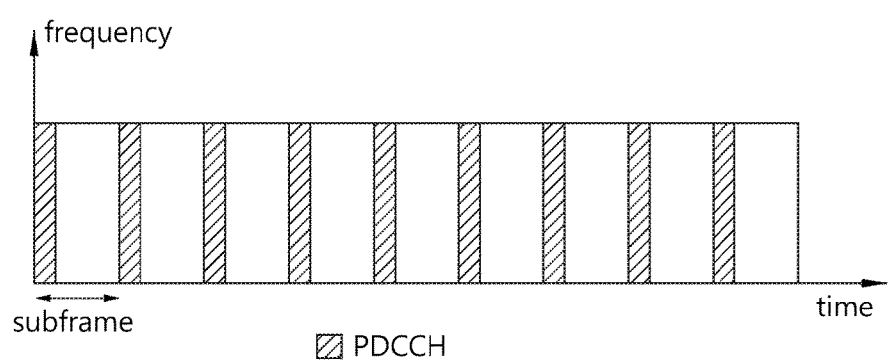
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

Hereinafter, access class barring (ACB) will be described.

Figure 5:
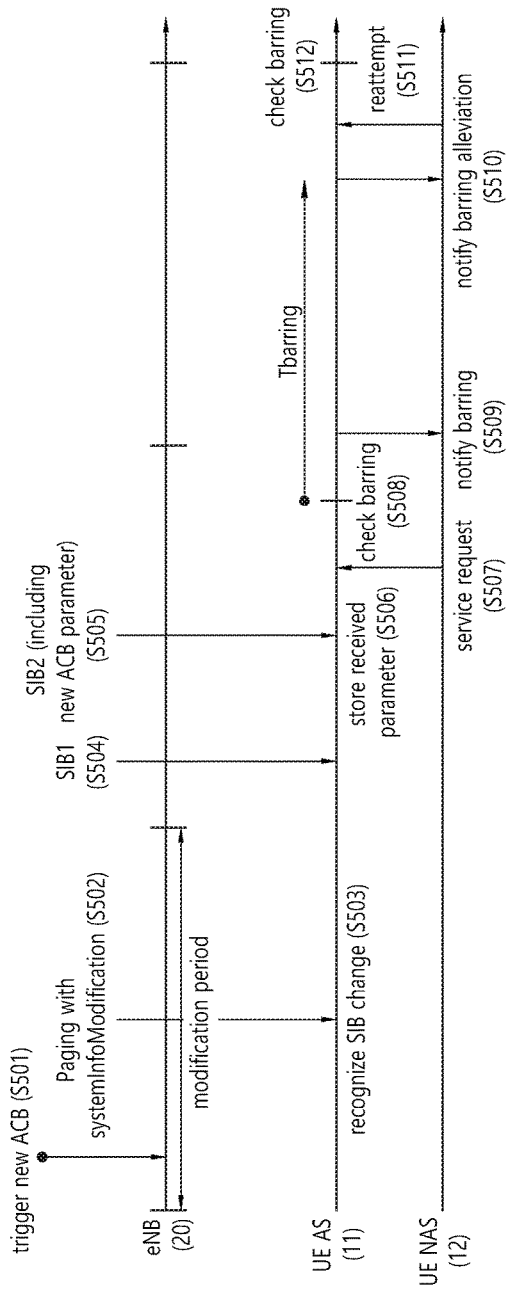
FIG. 5 shows an access class barring (ACB) operation.

FIG. 5 shows an ACB operation.

Referring to FIG. 5, ACB is a technique for controlling access of a UE to control system load, which includes a stage in which an eNB broadcasts barring information to UEs in advance and a stage in which UEs attempt to perform access based on a class that the UEs have and the barring information broadcast by the eNB 20. When new ACB information is triggered (S501), the eNB 20 may notify an UE AS 11 that SIB (SystemInformationBlock) information is to be changed soon due to the new ACB information, using a systemInfoModification IE of a paging (S502). The UE receiving the paging may recognize that the SIB information to be changed soon (S503). The systemInfoModication IE included in the paging is an indicator indicating that the SIB information is changed, and the indicator may have different forms according to embodiments.

The eNB 20 may notify the UE that the SIB information is to be changed soon through a paging in a modification period before broadcasting changed SIB information. Thereafter, the changed SIB information is broadcast in a next modification period.

After completing the modification period in which the paging is received, the UE receives SIB1 information to receive new SIB information (S504). There are several types of SIBs depending on purposes. SIB1 to SIB14 exist in Rel-11 LTE technology, and SIBs are continuously developed to support new functions of standard technologies. Among different SIBs, SIB1 may include scheduling information on other SIBs. Therefore, SIB1 needs to be received first in order to receive other SIB information.

Subsequently, the UE may receive SIB2 information including ACB information (S505). The UE AS 11 may store the ACB information (S506). A UE NAS 12 may send a service request to the UE AS 11 when a service, that is, communication, is needed (S507). Then, the UE AS 11 may determine whether to allow access based on the stored ACB information (S508). A UE is necessarily assigned a class with a value between 0 and 9. Further, the UE may further be assigned a class having a value of 11 to 15 for a special purpose. In addition, there is class 10 associated with an emergency call. The eNB 20 may restrict access to a particular class. In LTE technology, access to any designated one of classes 0 to 9 may not be restricted, and access to one or more designated classes among classes 11 to 15 for special purposes may be restricted.

Instead, the eNB 20 may provide a barring factor and barring time information with respect to classes 0 to 9. The barring factor may be a value ranging from 0 to 1. The UE selects one random value between 0 and 1 and compares the value with the barring factor. When the value selected by the UE is lower than the barring factor, it may be determined that access is allowed. When the value selected by the UE is higher than the barring factor, access is not allowed and the UE may notify the UE NAS 12 that access is not allowed (S509). When access is not allowed, the UE AS 11 may calculate a Tbarring value using the barring time information and the following equation. A method for calculating a Tbarring value according to an embodiment is as follows: "Tbarring"=(0.7+0.6*rand)*ac-Barring Time. A different Tbarring value may be calculated depending on an embodiment.

After Tbarring time, the UE AS 11 may notify the UE NAS 12 that it is possible to reattempt access (S510). Here, the UE NAS 12 reattempts to access the UE AS 11 (S511), and the UE AS 11 may perform a barring check again (S512). The process described in FIG. 5 may correspond to a general mobile originating (MO) call or signaling, that is, a service request triggered by a UE.

An emergency call triggered by a UE is slightly different from the above process. ACB information for an emergency call differs from an MO call or signaling. That is, ac-barringForEmergency information is provided instead of a barring factor or barring time information. The IE may indicate only whether an emergency call is allowed in a Boolean type. When the IE is set to true, the IE indicates that no emergency call is allowed, and access may finally be denied after checking a predetermined additional condition. Also, since no barring time information is provided, there is no stage in which the UE AS 11 notifies the UE NAS 12 whether access is possible after Tbarring. An ACB operation for an emergency call is described in more detail in FIG. 6.

Figure 6A:
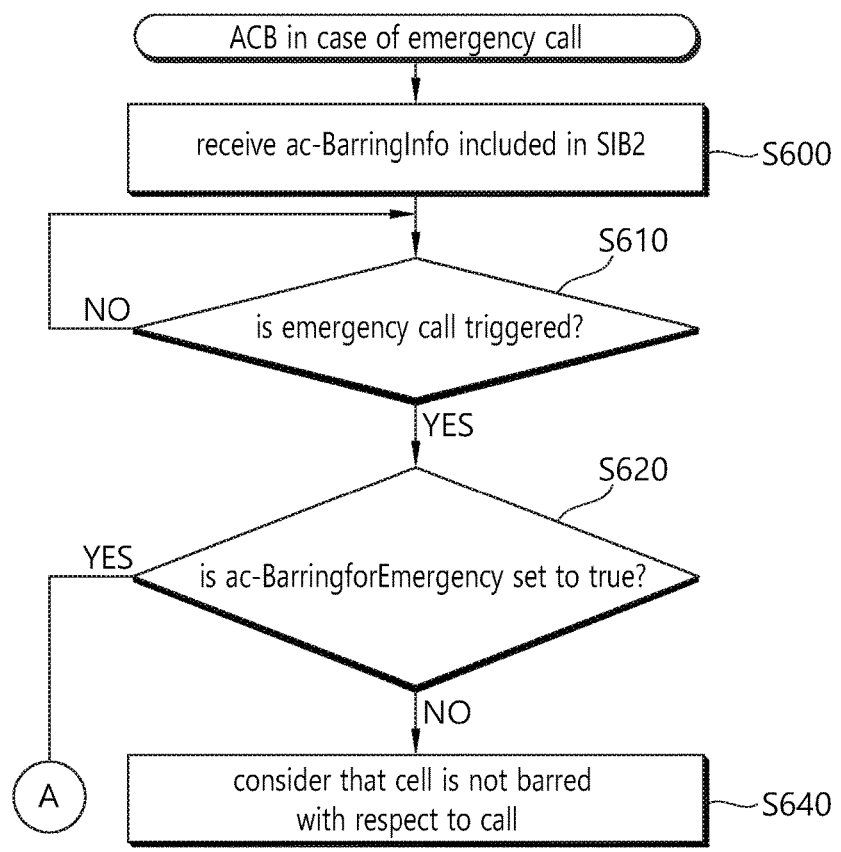

FIG. 6A and FIG. 6B show an ACB operation in case of an emergency call.

Referring to FIGS. 6A and 6B, a UE AS may receive SIB2 information broadcast by an eNB (S600). SIB2 may include an ac-BarringInfo IE including barring information. The UE AS may determine whether there is a request for an emergency call from a UE NAS (S610). When an emergency call is triggered, the UE AS may determine whether an ac-BarringForEmergency IE included in the ac-BarringInfo IE is set to true (S620). When the ac-BarringForEmergency IE is not true, the UE AS may regard the call as being allowed (S640). However, when the ac-BarringForEmergency IE is true, the UE AS may determine whether the UE further has one or more of classes 11 to 15 for special purposes, in addition to classes of 0 to 9 (S630).

When the UE does not have one or more of classes 11 to 15 for special purposes, the UE AS may consider that the call is not allowed (S670), and may notify the UE NAS that the call is not allowed (S680). When the UE has any one class for a special purpose, the UE AS may determine barring information on classes 11 to 15 included in the ac-BarringInfo IE (S650). In an embodiment, information in 5-bit bitmap format indicating whether to bar each special-purpose class may be included in the ac-BarringInfo IE. An ac-BarringForMO-Data IE in the ac-BarringInfo IE may have a 5-bit ac-BarringForSpecicalAC IE. In an embodiment, the respective bits may be sequentially mapped to AC11 to 15. When each bit is set to '1', a corresponding AC is considered to be barred. In this case, AC 12, 13, and 14 are valid in a home country, and AC 11 and 15 are valid only in an HPLMN/HEPLMN. When any one of the special-purpose classes possessed by the UE is allowed to access, access to the call may be regarded as being allowed (S660). Subsequently, the UE may attempt a random access process to attempt a connection with the eNB.

Hereinafter, an MBMS and a multicast/broadcast single frequency network (MBSFN) are described in detail.

MBSFN transmission or MBSFN-mode transmission refers to a simultaneous transmission scheme in which a plurality of cells transmits the same signal at the same time. MBSFN transmissions from a plurality of cells within an MBSFN area are perceived as a single transmission for a UE.

A multicast control channel (MCCH) is a downlink channel used for point-to-multipoint transmission of MBMS control information from a network to a UE. A method for transmitting an MBMS service includes single-cell point-to-multipoint (SCPTM) transmission and MBSFN transmission. MBSFN transmission transmits identifiable signals simultaneously in a plurality of cells, while SCPTM transmission transmits MBMS services in a single cell. Therefore, unlike MBSFN transmission, SCPTM transmission does not need synchronization between cells. Also, unlike MBSFN transmission, SCPTM transmission uses an existing PDSCH and thus has unicast characteristics. That is, a plurality of UEs reads the same PDCCH and acquires an RNTI for each service, thereby receiving an SCPTM service. When an SCPTM-dedicated MCCH is introduced and a UE determines that a desired service is an SCPTM service through the MCCH, the UE may receive the SCPTM service by acquiring a corresponding RNTI value and reading a PDCCH through the RNTI.

SCPTM is a broadcast but may use hybrid automatic repeat request (HARQ) feedback and channel state information (CSI) reporting in order to improve spectral efficiency. However, some SCPTM services may not need HARQ feedback or CSI reporting depending on service types or subscriber numbers. Since an RRC connection is required to use HARQ feedback or CSI reporting, a UE interested in SCPTM transmission needs to know whether it is necessary to establish an RRC connection in order to receive an SCPTM service of interest.

In addition, even though the UE has established an RRC connection for SCPTM reception, the UE does not require additional downlink resources except for initial setup. Thus, when some congestion situations occur in a network, a UE interested only in SCPTM transmission needs to be handled differently.

Hereinafter, establishment of an RRC connection for SCPTM reception by a UE according to the present invention is described.

Step 1: The UE may receive a list of available SCPTM services from a serving cell. The list of available SCPTM services may be provided via SCPTM transmission. The list of available SCPTM services may be broadcast from the serving cell through a BCCH or MCCH logical channel. The list of available SCPTM services may include service identities (or temporary mobile group identifiers (TMGIs) and session identities). Also, the list of available SCPTM services may include an SCPTM-RNTI corresponding to the available SCPTM services. The SCPTM-RNTI is an identification for SCPTM reception. The same SCPTM-RNTI may be assigned to a plurality of UEs. The SCPTM-RNTI may be allocated for each SCPTM service.

Step 2: When the UE is receiving or is about to receive an SCPTM service, the UE may consider the service as an SCPTM service of interest. The UE may identify the identifier of the SCPTM service through a user service description (USD).

Step 3: When at least one of SCPTM services of interest is provided from a cell on which the UE camps and an RRC connection is required for service reception, the UE may initiate an RRC connection establishment procedure. The SCPTM services may be defined as two types.

In the present invention, a first-type SCPTM service is defined as an SCPTM service that an IDLE-mode UE may receive, and a second-type SCPTM service is defined as an SCPTM service that only a CONNECTED-mode UE may receive.

The first-type SCPTM service may not require HARQ feedback and/or CSI reporting from a receiver. Also, when the UE is interested only in the first-type SCPTM service, the UE may not start an RRC connection establishment procedure to receive the first-type SCPTM service.

The second-type SCPTM service may require HARQ feedback and/or CSI reporting from the receiver. Also, when the UE is interested in the second-type SCPTM service, the UE may start an RRC connection establishment procedure to receive the second-type SCPTM service.

The UE may identify through the USD whether the SCPTM service of interest is a first-type SCPTM service or a second-type SCPTM service. Alternatively, the type of the SCPTM service may be broadcast from the serving cell via the BCCH or MCCH, and the UE may acquire this information in step 1, thus identifying the type of the SCPTM service of interest.

The UE may perform an access barring check for SCPTM reception. When the UE establishes an RRC connection to receive second-type SCPTM service and SystemInformationBlockType2 includes ac-BarringSkipForSCPTM, the UE may consider that access to the cell is not barred. When the UE establishes an RRC connection to receive second-type SCPTM service and SystemInformationBlockType2 includes no ac-BarringSkipForSCPTM, the UE may perform an access barring check according to an access class barring configuration for SCPTM Verification. Preferably, an access barring factor may be set greater than other access class barring configurations (that is, ac-BarringForMO-Signaling or ac-BarringForMO-Data).

A cause of new RRC connection establishment for SCPTM reception may be defined. The UE may set establishmentCause in an RRC connection request message for SCPTM reception. In this case, when establishmentCause indicates SCPTM reception, a network may allow access of the UE even if the network is congested.

Step 4: The UE may receive a second-type SCPTM service configuration from the serving cell. The second-type SCPTM service configuration may include an HARQ feedback configuration and a CSI report configuration.

Step 5: When the UE determines to stop receiving all second-type SCPTM services, the UE may notify the network of this information, which may be achieved by sending an SCPTM interest indication. Preferably, when the network receives this notification, the network may release the RRC connection to the UE. Alternatively, a new indication may be defined for this notification (since a current MBMS interest indication includes only frequency level information).

FIG. 7 illustrates a procedure in which a UE establishes an RRC connection for SCPTM reception according to one embodiment of the present invention.

The UE is currently in the IDLE mode. When access to a network is allowed, the UE may receive system information necessary for evaluation (S710). In the embodiment of FIG. 7, it is assumed that system information block type 2 (SIB2) includes no ac-BarringSkipForSCPTM. In addition, SIB2 may include an access class barring configuration for SCPTM.

The UE may receive a list of available SCPTM services (S720). The list of available SCPTM services may be broadcast through an MCCH or BCCH.

The UE is interested in SCPTM service A and service C (S730). It is assumed that service A is a second-type SCPTM service and service C is a first-type SCPTM service. Therefore, an RRC connection may be required to receive service A, while no RRC connection may be required to receive service C.

Accordingly, the UE may start establishing an RRC connection to receive SCPTM service A (S740). Here, it is noted that the UE may receive service C even before establishing an RRC connection. As assumed above, received SIB2 includes no ac-BarringSkipForSCPTM. Thus, the UE may check access barring according to the received access class barring configuration for SCPTM. In the embodiment of FIG. 7, it is assumed that access to a cell is not barred as a result of checking access barring according to the access class barring configuration. The UE may receive service A.

The UE may receive a second-type SCPTM service configuration for receiving service A (S750). The second-type SCPTM service configuration may include an HARQ feedback configuration or a CSI report configuration.

The UE may determine to stop receiving service A (S760). Therefore, the UE does not need to maintain the RRC connection and may transmit a second-type SCPTM reception stop indication to the network (S770).

The UE receives an RRC connection release message from the serving cell and may enter the IDLE mode (S780). Here, it is noted that the UE may receive service C corresponding to the first-type SCPTM service through a DTCH even in the IDLE mode.

Figure 8:
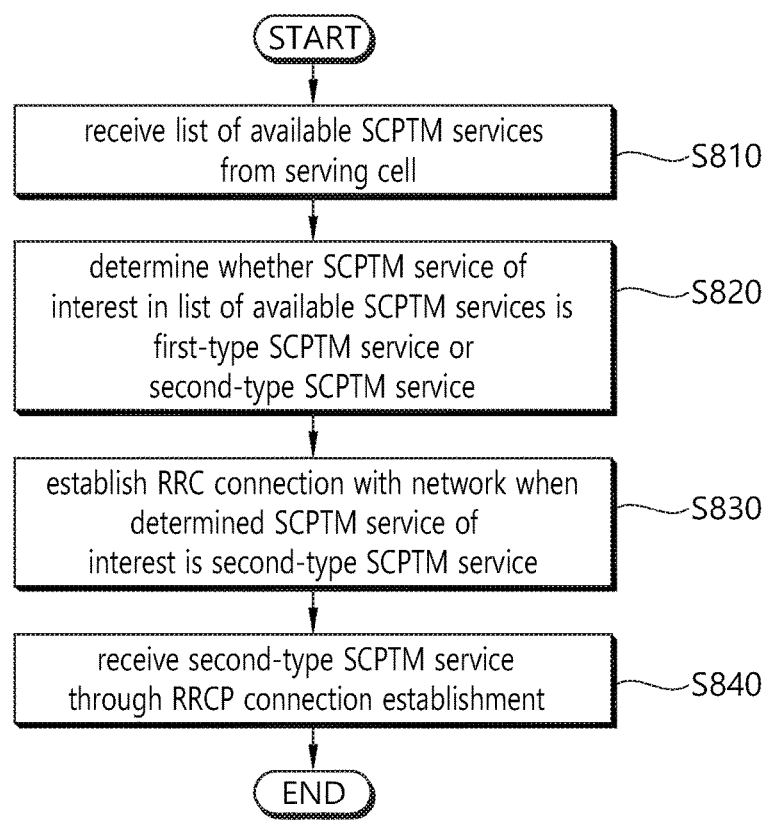
FIG. 8 is a block diagram illustrating a method in which a UE establishes an RRC connection for SCPTM reception according to one embodiment of the present invention.

FIG. 8 is a block diagram illustrating a method in which a UE establishes an RRC connection for SCPTM reception according to one embodiment of the present invention.

The UE may receive a list of available SCPTM services from a serving cell (S810). The list of available SCPTM services may be broadcast through a BCCH or MCCH. The list of available SCPTM services may include at least one of a service identifier, a temporary mobile group identifier (TMGI), and a session identifier.

The UE may determine whether an SCPTM service of interest in the list of available SCPTM services is a first-type SCPTM service or a second-type SCPTM service (S820). Such determination may be made through a USD. The first-type SCPTM service may be a service that requires no RRC connection establishment for the SCPTM service, and the second-type SCPTM service may be a service that requires RRC connection establishment for the SCPTM service. That is, the first-type SCPTM service may be a service that requires neither HARQ feedback nor CSI reporting, while the second-type SCPTM service may be a service that requires HARQ feedback or CSI reporting.

The UE may receive a second-type SCPTM service configuration from the serving cell, and the second-type SCPTM service configuration may include an HARQ feedback configuration or a CSI report configuration.

The UE may receive the type of the available SCPTM services directly from the serving cell, or the type of the available SCPTM services may be broadcast through a BCCH or MCCH.

The UE may receive SIB2 from the serving cell. When SIB2 includes ac-BarringSkipForSCPTM, the UE may consider that access to the serving cell is not barred. When SIB2 includes no ac-BarringSkipForSCPTM, the UE may perform an access barring check according to an access class barring configuration for SCPTM, in which an access barring factor of the access class barring configuration for SCPTM may be set greater than ac-BarringForMO-Signaling or ac-BarringForMO-Data.

The UE may transmit establishmentCause to the serving cell. When establishmentCause indicates SCPTM reception, the network may always allow access of the UE even in a congested situation.

When the determined SCPTM service of interest is the second-type SCPTM service, the UE may establish an RRC connection with the network (S830).

The UE may receive the second-type SCPTM service through the established RRC connection (S840). Thereafter, when the UE determines to stop receiving the second-type SCPTM service, the UE may transmit a second-type SCPTM reception stop indication to the network. Upon receiving the second-type SCPTM reception stop indication, the network may release the RRC connection, and thus the UE may enter the RRC IDLE mode.

Figure 9:
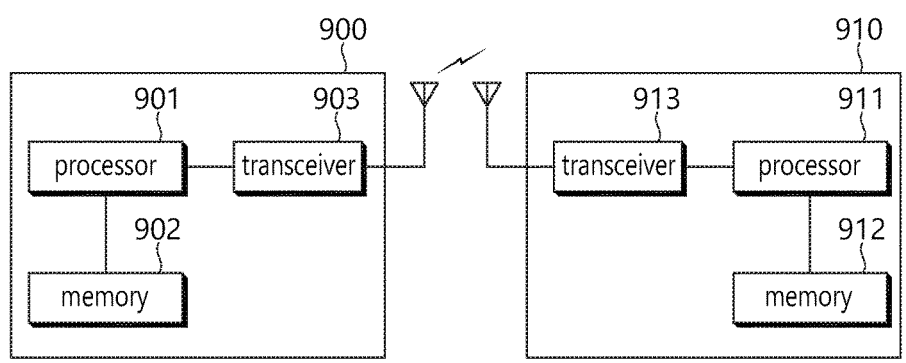
FIG. 9 is a block diagram illustrating a wireless communication system according to the embodiment of the present invention.

FIG. 9 is a block diagram illustrating a wireless communication system according to the embodiment of the present invention.

A BS 900 includes a processor 901, a memory 902 and a transceiver 903. The memory 902 is connected to the processor 901, and stores various information for driving the processor 901. The transceiver 903 is connected to the processor 901, and transmits and/or receives radio signals. The processor 901 implements proposed functions, processes and/or methods. In the above embodiment, an operation of the base station may be implemented by the processor 901.

A UE 910 includes a processor 911, a memory 912 and a transceiver 913. The memory 912 is connected to the processor 911, and stores various information for driving the processor 911. The transceiver 913 is connected to the processor 911, and transmits and/or receives radio signals. The processor 911 implements proposed functions, processes and/or methods. In the above embodiment, an operation of the UE may be implemented by the processor 911.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for establishing a radio resource control (RRC) connection by a user equipment (UE) interested in single-cell point-to-multipoint (SCPTM) transmission in a wireless communication system, the method comprising:
receiving a list of available SCPTM services from a serving cell;
receiving a system information block (SIB) from the serving cell;
determining whether an SCPTM service of interest in the list of available SCPTM services is a first-type SCPTM service or a second-type SCPTM service; and
when the UE determines the SCPTM service of interest is the second-type SCPTM service:
performing an access barring check based on an access class barring configuration for SCPTM when the SIB does not include ac-BarringSkipForSCPTM,
establishing an RRC connection with a network, and
receiving the second-type SCPTM service through the established RRC connection,
wherein the first-type SCPTM service is a service that requires no RRC connection establishment for the SCPTM service, and the second-type SCPTM service is a service that requires RRC connection establishment for the SCPTM service, and
wherein an access barring factor of the access class barring configuration for the SCPTM is set greater than ac-BarringForMO-Signaling or ac-BarringForMO-Data.

2. The method of claim 1, further comprising receiving a second-type SCPTM service configuration from the serving cell, wherein the second-type SCPTM service configuration includes a hybrid automatic repeat request (HARQ) feedback configuration or a channel state information (CSI) report configuration.

3. The method of claim 1, wherein the second-type SCPTM service is a service that requires HARQ feedback or CSI reporting.

4. The method of claim 1, wherein the list of available SCPTM services is broadcast through a broadcast control channel (BCCH) or multicast control channel (MCCH).

5. The method of claim 1, wherein the list of available SCPTM services includes at least one of a service identifier, a temporary mobile group identifier (TMGI), and a session identifier.

6. The method of claim 1, wherein it is determined whether the SCPTM service of interest is the first-type SCPTM service or the second-type SCPTM service through a user service description (USD).

7. The method of claim 1, further comprising receiving a type of the available SCPTM services directly from the serving cell.

8. The method of claim 7, wherein the type of the available SCPTM services is broadcast through a BCCH or MCCH.

9. The method of claim 1, further comprising:
considering that access to the serving cell is not barred when the SIB includes ac-BarringSkipForSCPTM.

10. The method of claim 1, further comprising:
transmitting establishment cause to the serving cell,
wherein the network always allows access of the UE, when the establishment cause indicates SCPTM reception.

11. The method of claim 1, further comprising:
transmitting a second-type SCPTM reception stop indication to the network, when the UE determines to stop receiving the second-type SCPTM service.

12. A user equipment (UE) establishing a radio resource control (RRC) connection in a wireless communication system, the UE comprising:
a memory;
a transceiver; and
a processor to connect the memory and the transceiver,
wherein the processor is configured to:
control the transceiver to receive a list of available SCPTM services from a serving cell, control the transceiver to receive a system information block (SIB) from the serving cell, determine whether an SCPTM service of interest in the list of available SCPTM services is a first-type SCPTM service or a second-type SCPTM service, when the UE determines the SCPTM service of interest is the second-type SCPTM service:
- perform an access barring check based on an access class barring configuration for SCPTM when the SIB does not include ac-BarringSkipForSCPTM,
- establish an RRC connection with a network, and
- control the transceiver to receive the second-type SCPTM service through the established RRC connection, wherein the first-type SCPTM service is a service that requires no RRC connection establishment for the SCPTM service, and the second-type SCPTM service is a service that requires RRC connection establishment for the SCPTM service, and wherein an access barring factor of the access class barring configuration for the SCPTM is set greater than ac-BarringForMO-Signaling or ac-BarringForMO-Data.

13. The UE of claim 12, the second-type SCPTM service is a service that requires hybrid automatic repeat request (HARQ) feedback or channel state information (CSI) reporting.

14. The UE of claim 12, wherein the processor is configured to transmit a second-type SCPTM reception stop indication to the network when it is determined to stop receiving the second-type SCPTM service.

* * * * *